United States Patent
Hara et al.

(10) Patent No.: US 12,474,215 B2
(45) Date of Patent: Nov. 18, 2025

(54) ELECTROMAGNETIC WAVE SENSOR

(71) Applicant: TDK CORPORATION, Tokyo (JP)

(72) Inventors: Shinji Hara, Tokyo (JP); Naoki Ohta, Tokyo (JP); Kazuya Maekawa, Tokyo (JP); Susumu Aoki, Tokyo (JP); Maiko Shirokawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 600 days.

(21) Appl. No.: 17/889,149

(22) Filed: Aug. 16, 2022

(65) Prior Publication Data

US 2023/0055177 A1    Feb. 23, 2023

(30) Foreign Application Priority Data

Aug. 20, 2021    (JP) ................................. 2021-134805

(51) Int. Cl.
*G01J 5/10* (2006.01)
*G01J 5/08* (2022.01)
*G01J 5/00* (2022.01)

(52) U.S. Cl.
CPC .............. *G01J 5/10* (2013.01); *G01J 5/0853* (2013.01); *G01J 2005/0077* (2013.01); *G01J 2005/103* (2013.01)

(58) Field of Classification Search
None
See application file for complete search history.

(56) References Cited

U.S. PATENT DOCUMENTS

| 7,002,153 B1 | 2/2006 | Gillham et al. |
| 2006/0202882 A1* | 9/2006 | Noda .................... H05K 9/0083 342/4 |
| 2014/0048708 A1 | 2/2014 | Ouvrier-Buffet et al. |
| 2020/0408604 A1 | 12/2020 | Ohta et al. |

FOREIGN PATENT DOCUMENTS

| WO | WO-2016129293 A1 * | 8/2016 | ............ G01J 5/0225 |
| WO | 2019/171488 A1 | 9/2019 | |

* cited by examiner

*Primary Examiner* — Erica S Lin
(74) *Attorney, Agent, or Firm* — Oliff PLC

(57) ABSTRACT

An electromagnetic wave sensor has electromagnetic wave absorbers disposed side by side in first and second directions, temperature detection portions held by the respective electromagnetic wave absorbers and sets of two arm portions connected to each of the electromagnetic wave absorbers at two connection portions. In a plan view, the arm portions have two first extending portions extending from the connection portions in directions of which components in the second direction are opposite to each other, and two second extending portions extending from the first extending portions in directions of which components in the first direction are opposite to each other. Four sides of a rectangle circumscribing each of the electromagnetic wave absorbers with a smallest area are inclined with respect to the first direction in directions in which each of the electromagnetic wave absorbers approaches the second extending portions with the connection portions as fulcrums.

9 Claims, 12 Drawing Sheets

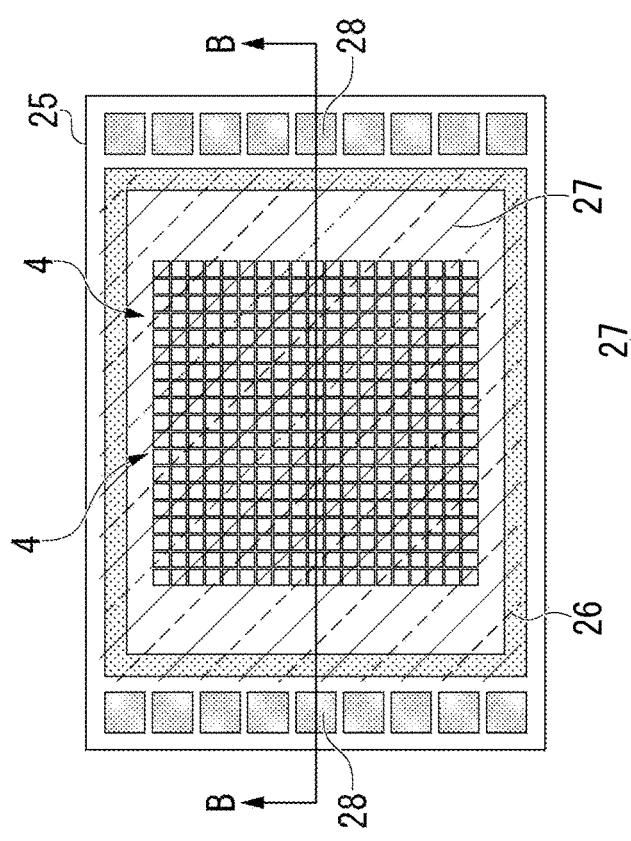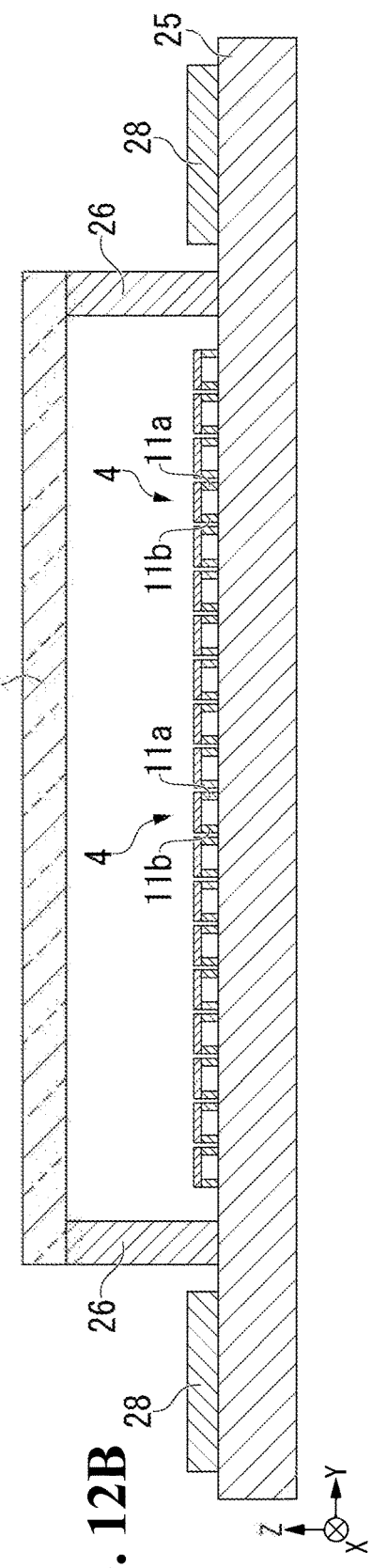
FIG. 12A
FIG. 12B

ELECTROMAGNETIC WAVE SENSOR

CROSS-REFERENCES TO RELATED APPLICATIONS

This application relies for priority upon Japanese Patent Application No. 2021-134805, filed on Aug. 20, 2021 the entire content of which is hereby incorporated herein by reference for all purposes as if fully set forth herein.

BACKGROUND

The present disclosure relates to an electromagnetic wave sensor.

For example, there is an electromagnetic wave sensor using a thermistor film. The electrical resistance of a thermistor film varies in accordance with a variance in temperature of the thermistor film. Similarly, there is an electromagnetic wave sensor using a thermopile. An electromotive force of a thermopile varies in accordance with a variance in temperature of the thermopile. In these electromagnetic wave sensors, incident infrared rays (electromagnetic waves) are absorbed by a temperature detection portion (a thermistor film or a thermopile portion) and materials around the temperature detection portion so that the temperature of this temperature detection portion varies. Accordingly, an electromagnetic wave detection element constituted of the temperature detection portion and materials therearound detects infrared rays (electromagnetic waves).

Here, according to the Stefan-Boltzmann law, there is a correlation between the temperature of a measurement object and infrared rays (radiant heat) discharged from this measurement object due to heat radiation. Therefore, the temperature of a measurement object can be measured in a non-contact manner by detecting infrared rays discharged from the measurement object using the electromagnetic wave detection element.

In addition, in such an electromagnetic wave detection element, electromagnetic wave detection elements are arranged in an array to be applied to an electromagnetic wave sensor such as an infrared image capturing element (infrared image sensor) detecting (capturing an image of) a temperature distribution of a measurement object in a two-dimensional manner (for example, refer to Patent Document 1).

PATENT DOCUMENTS

[Patent Document 1] PCT International Publication No. WO 2019/171488

SUMMARY

However, for example, the electromagnetic wave sensor described in the foregoing Patent Document 1 is required to have durability to withstand long-term use. For example, the inventor has found that when a temperature lower than expected is observed from a measurement object, the electromagnetic wave detection element rotates due to a temperature drop of the electromagnetic wave detection element or the like. The electromagnetic wave detection element rotates and comes into contact with adjacent members, and there is concern that this contact may occur once or multiple times, which may cause a malfunction.

It is desirable to provide an electromagnetic wave sensor having high durability withstanding long-term use and having high reliability.

Following means are provided.

[1] An electromagnetic wave sensor includes electromagnetic wave absorbers that are disposed side by side in a first direction and a second direction intersecting each other within a plane, temperature detection portions that are held by the respective electromagnetic wave absorbers, and sets of two arm portions that are in a bent line shape and connected to each of the electromagnetic wave absorbers at two connection portions in each of the electromagnetic wave absorbers. In a plan view, the two arm portions have two first extending portions extending from the two connection portions in directions of which components in the second direction are opposite to each other, and two second extending portions extending from the two first extending portions in directions of which components in the first direction are opposite to each other. In a plan view, four sides of a rectangle or a square circumscribing each of the electromagnetic wave absorbers with a smallest area are inclined with respect to the first direction in directions in which each of the electromagnetic wave absorbers approaches the two second extending portions with the two connection portions as fulcrums.

BRIEF DESCRIPTION OF THE DRAWINGS

FIG. 12A is a plan view illustrating a modification example of the electromagnetic wave sensor in FIG. 1, and FIG. 12B is a cross-sectional view along line segment B-B.

DETAILED DESCRIPTION

Figure 1:
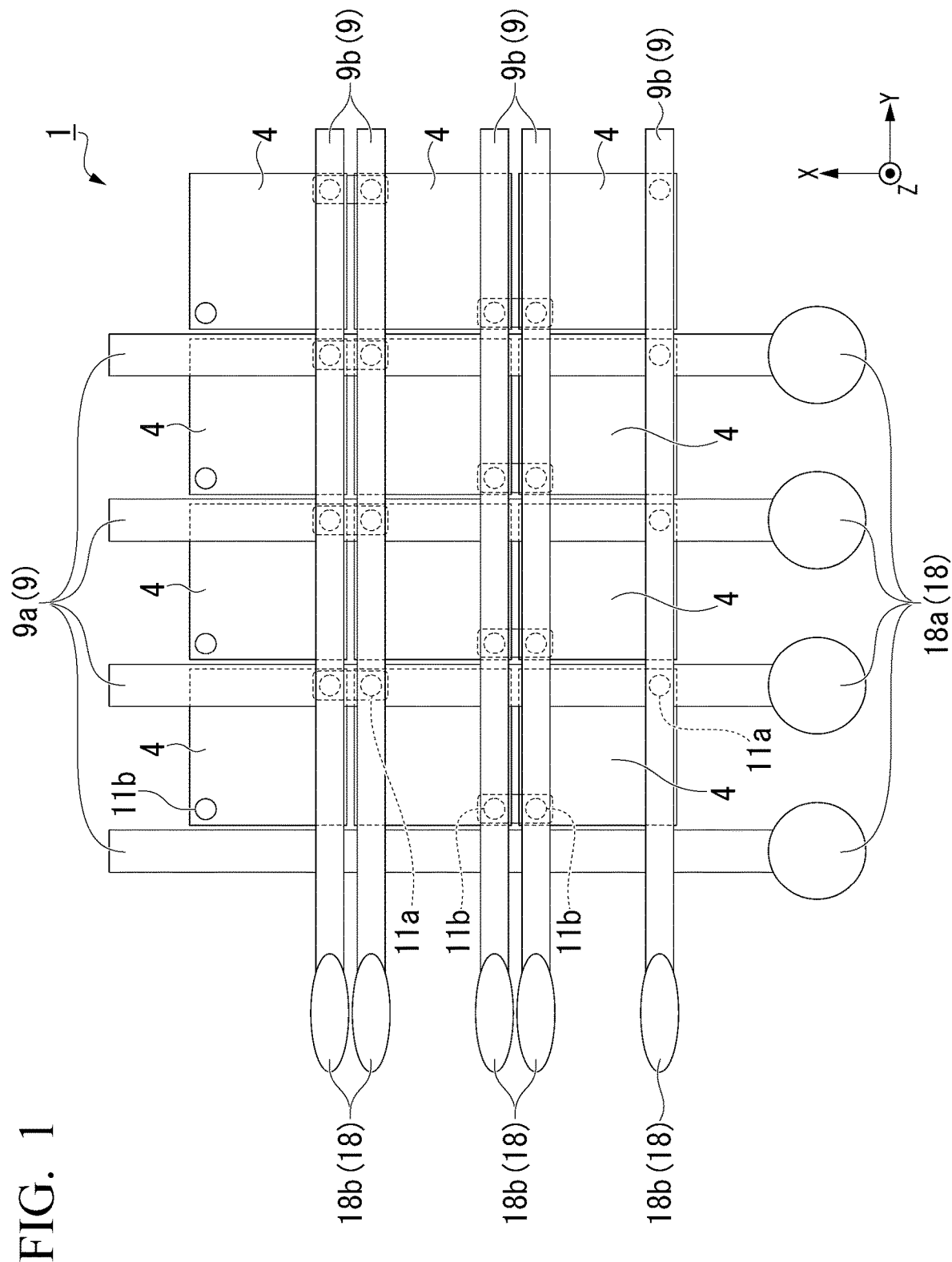
FIG. 1 is a plan view illustrating a constitution of an electromagnetic wave sensor according to an embodiment of the present disclosure.

Hereinafter, an embodiment of the present disclosure will be described in detail with reference to the drawings.

In the drawings used in the following description, in order to make each of constituent elements easier to see, scales of dimensions may differ depending on the constituent element, and it is assumed that dimensional ratios and the like of each of the constituent elements are not always the same as the actual ratios thereof. In addition, materials and the like exemplified in the following description are examples, and the present disclosure is not necessarily limited thereto. The present disclosure can be suitably changed and performed within a range not changing the gist thereof.

In addition, in the following drawings, an XYZ orthogonal coordinate system is set. An X axis direction will be referred to as a first direction X within a particular plane of an electromagnetic wave sensor, a Y axis direction will be referred to as a second direction Y orthogonal to the first direction X within the particular plane of the electromagnetic wave sensor, and a Z axis direction will be referred to as a third direction orthogonal to the particular plane of the electromagnetic wave sensor, respectively.

According to the present disclosure, it is possible to provide an electromagnetic wave sensor having high durability withstanding long-term use and having high reliability.

[Electromagnetic Wave Sensor]

First, regarding the embodiment of the present disclosure, for example, an electromagnetic wave sensor 1 illustrated in FIGS. 1 to 5 will be described.

Figure 2:
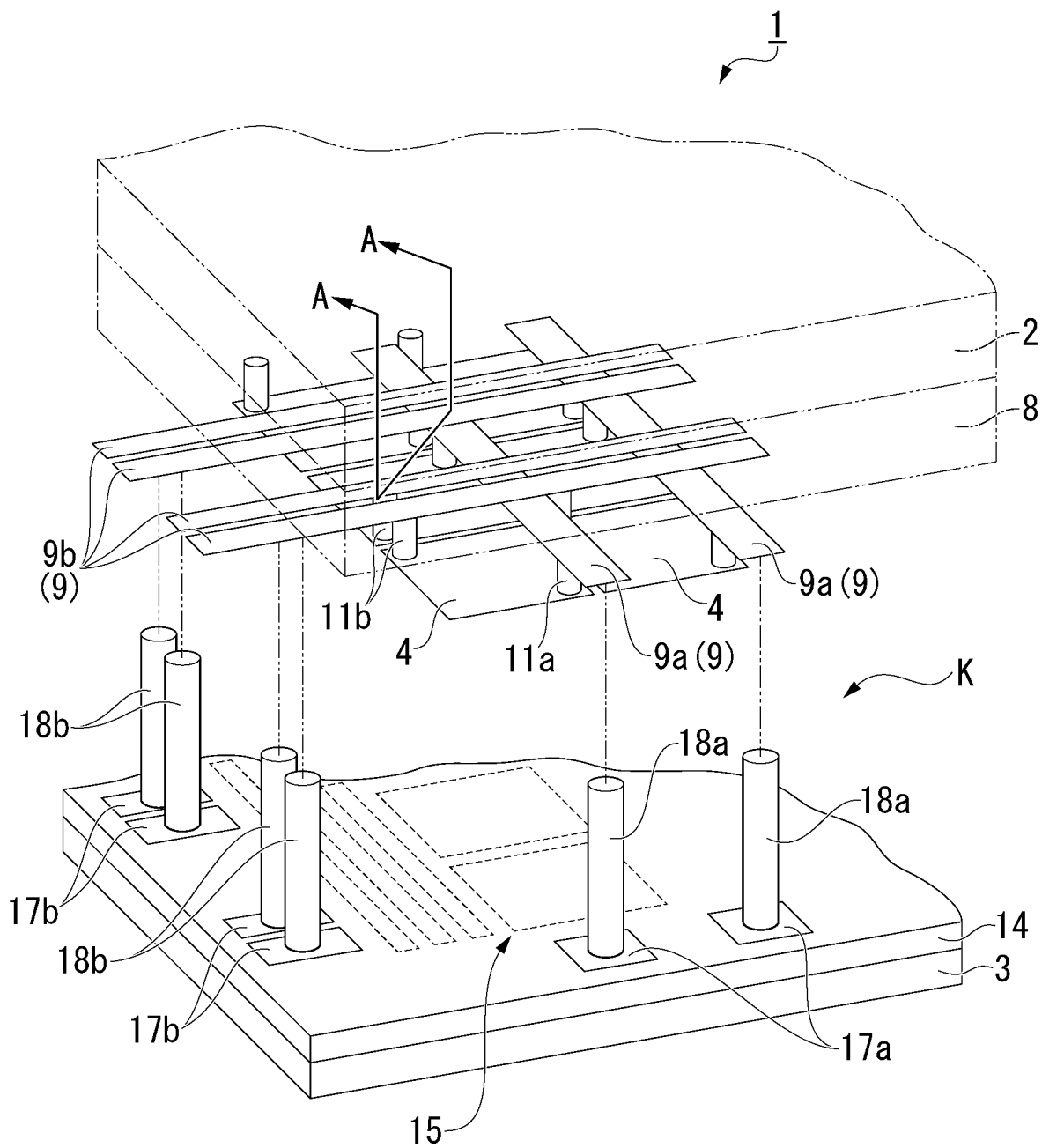
FIG. 2 is an exploded perspective view illustrating a constitution of the electromagnetic wave sensor illustrated in FIG. 1.
Figure 3:
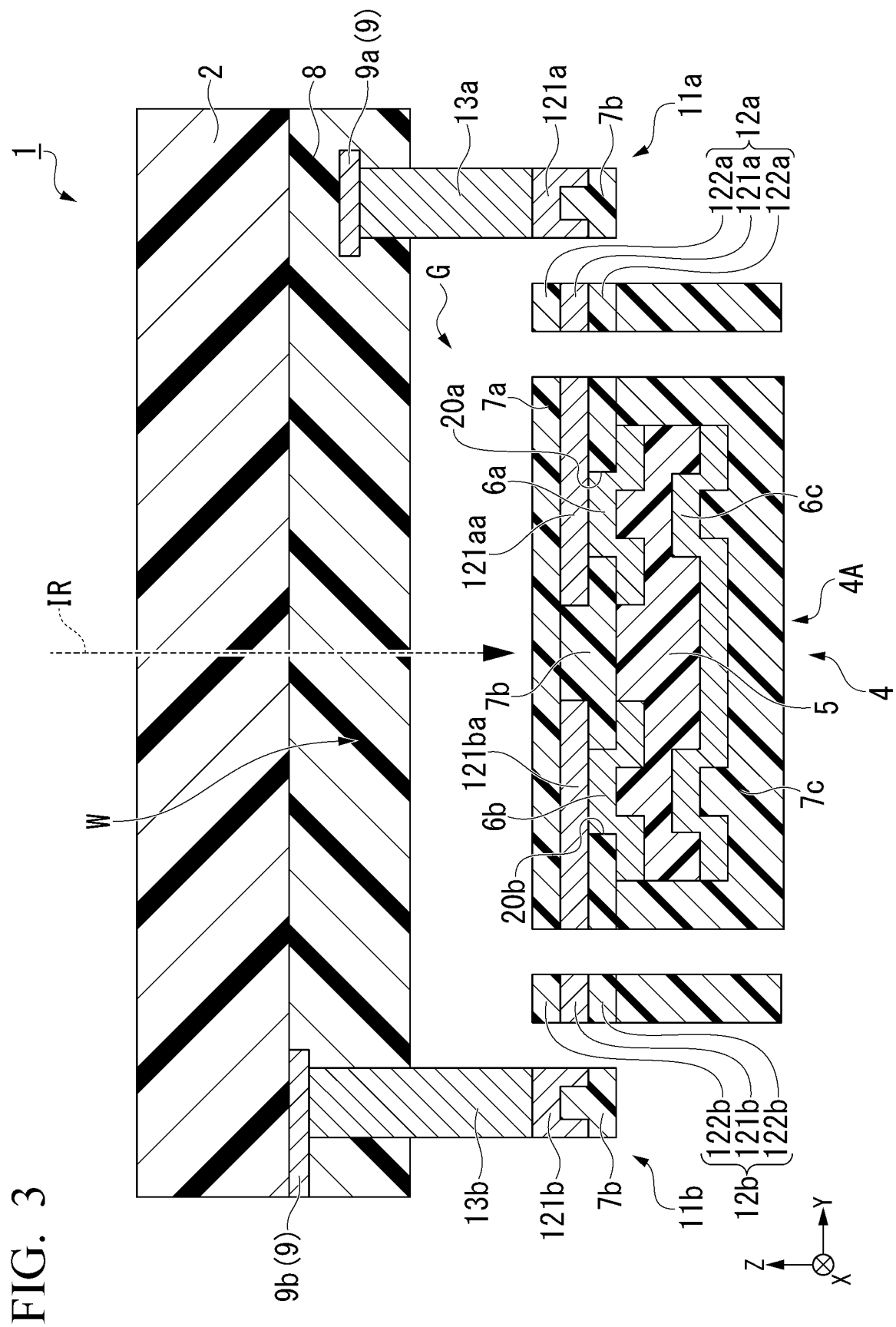
FIG. 3 is a cross-sectional view of the electromagnetic wave sensor along line segment A-A illustrated in FIGS. 2 and 4.
Figure 4:
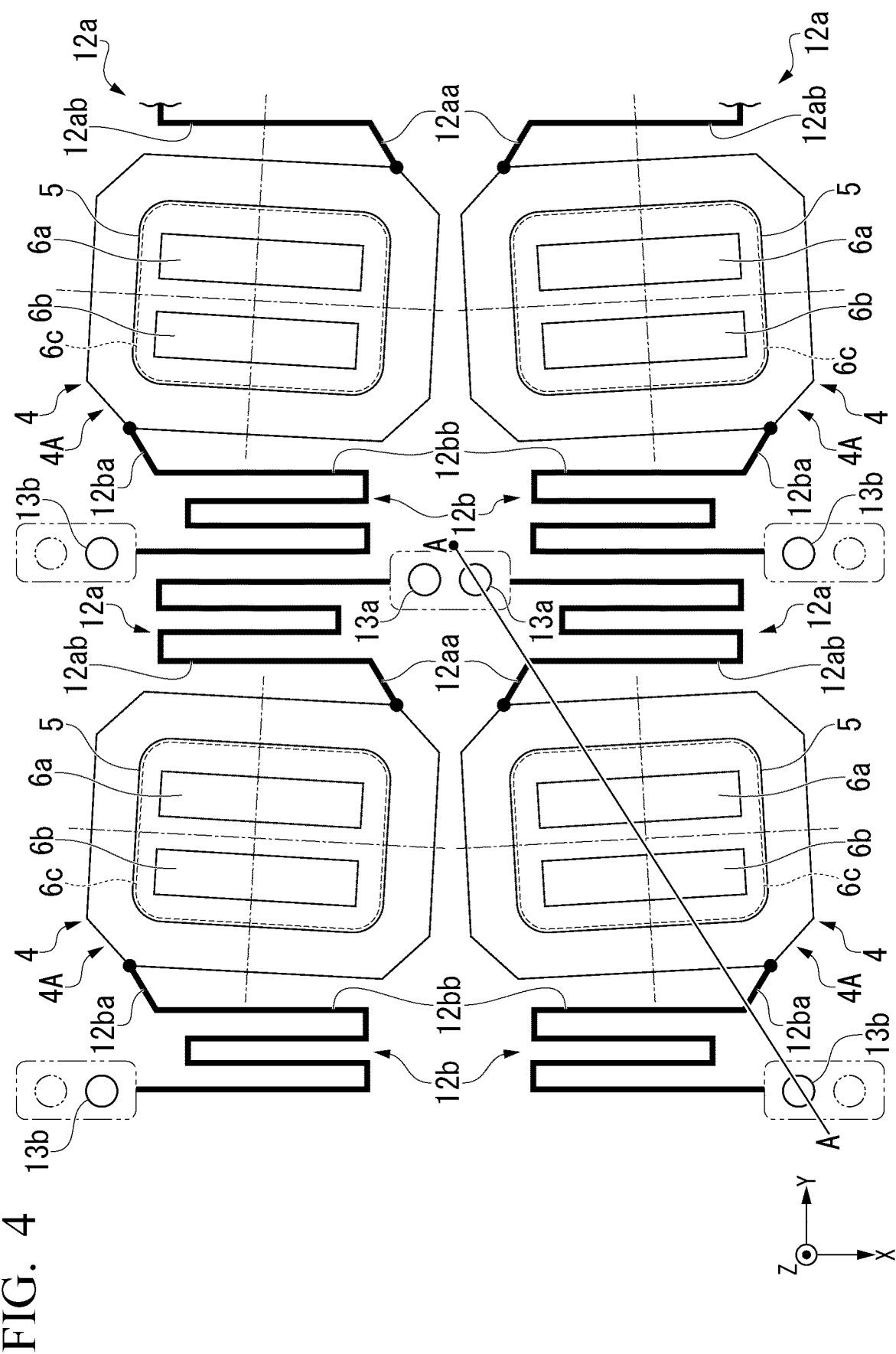
FIG. 4 is a plan view illustrating a specific constitution of the electromagnetic wave sensor.
Figure 5:
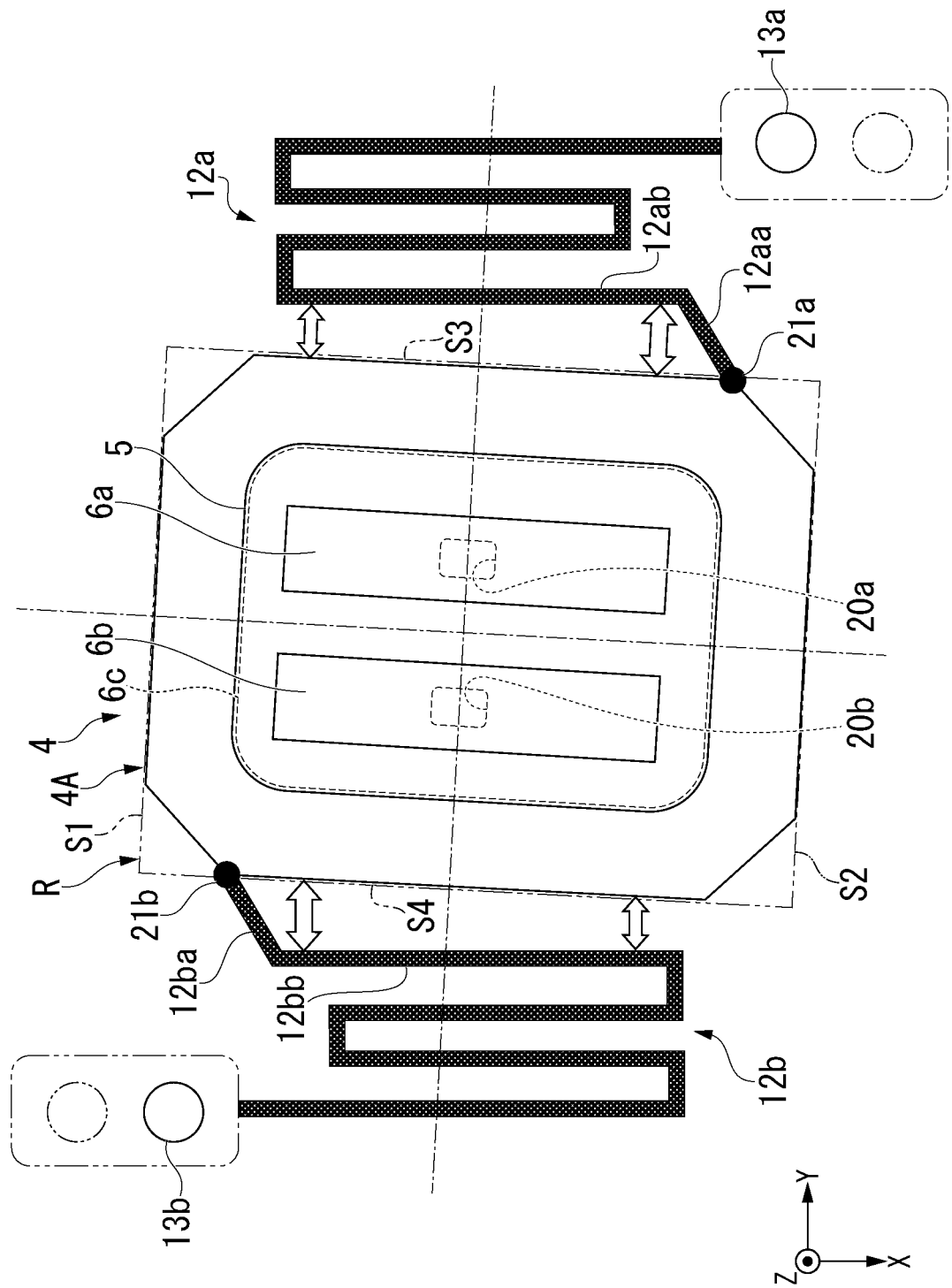
FIG. 5 is an enlarged plan view of the electromagnetic wave sensor 1 in FIG. 4.

FIG. 1 is a plan view illustrating a constitution of the electromagnetic wave sensor 1. FIG. 2 is an exploded perspective view illustrating a constitution of the electromagnetic wave sensor 1. FIG. 3 is a cross-sectional view illustrating a constitution of the electromagnetic wave sensor 1. FIG. 4 is a plan view illustrating a specific constitution of the electromagnetic wave sensor 1. FIG. 5 is an enlarged plan view of the electromagnetic wave sensor 1 in FIG. 4.

The electromagnetic wave sensor 1 of the present embodiment is a sensor having the present disclosure applied to an image capturing element (image sensor) detecting (capturing an image of) a temperature distribution of a measurement object in a two-dimensional manner by detecting electromagnetic waves such as infrared rays discharged from this measurement object. Hereinafter, infrared rays will be described as an example of electromagnetic waves discharged from a measurement object.

Infrared rays are electromagnetic waves having a wavelength within a range of 0.75 µm to 1,000 µm. An infrared image sensor is utilized not only for indoor/outdoor scotopic vision and the like as an infrared camera but is also utilized for temperature measurement and the like of humans and objects as a non-contact-type temperature sensor.

Specifically, as illustrated in FIGS. 1 to 3, this electromagnetic wave sensor 1 includes a first substrate 2 and a second substrate 3 which are disposed such that they face each other, and electromagnetic wave detection elements 4 which are disposed between the first substrate 2 and the second substrate 3.

The first substrate 2 and the second substrate 3 are constituted as silicon substrates having a transparency with respect to electromagnetic waves (which will hereinafter be referred to as "infrared rays") IR having a certain particular wavelength (long-wave infrared rays having a wavelength within a range of 8 to 14 µm, in the present embodiment). In addition, a germanium substrate or the like can be used as a substrate having a transparency with respect to the infrared rays IR.

In the first substrate 2 and the second substrate 3, perimeters of surfaces thereof facing each other are sealed using a seal material (not illustrated) so that a hermetically sealed internal space K is constituted therebetween. In addition, the internal space K is depressurized to a high vacuum state. Accordingly, in the electromagnetic wave sensor 1, an influence of heat due to a convection current in the internal space K is curbed, and an influence by heat other than the infrared rays IR discharged from a measurement object with respect to the electromagnetic wave detection elements 4 is eliminated.

The electromagnetic wave sensor 1 of the present embodiment is not necessarily limited to the constitution in which the hermetically sealed internal space K described above is depressurized, and it may be constituted to have the internal space K which is hermetically sealed or open at atmospheric pressure.

In addition, as illustrated in FIG. 4, the electromagnetic wave sensor 1 has electromagnetic wave absorbers 4A which are disposed side by side in a first direction (X direction) and a second direction (Y direction) intersecting each other within a plane, temperature detection portions 5 which are held by the respective electromagnetic wave absorbers 4A, and sets of two arm portions 12a and 12b. The two arm portions 12a and 12b are in a bent line shape and connected to each of the electromagnetic wave absorbers 4A at two connection portions 21a and 21b in each of the electromagnetic wave absorbers 4A. The temperature detection portions 5 are provided for the respective electromagnetic wave detection elements 4, and the two arm portions 12a and 12b are disposed on both sides of each of the electromagnetic wave detection elements 4.

Each of the electromagnetic wave detection elements 4 includes the temperature detection portion 5 which detects a temperature, a pair of first electrodes 6a and 6b which are provided such that they come into contact with one surface of the temperature detection portion 5, a second electrode 6c which is provided such that it comes into contact with the other surface of the temperature detection portion 5, and insulating films 7a, 7b, and 7c which cover the temperature detection portion 5. Each of the electromagnetic wave detection elements 4 has a current-perpendicular-to-plane (CPP) structure in which a current flows in a perpendicular-to-plane direction of the temperature detection portion 5. The insulating film 7b is provided on a side of the pair of first electrodes 6a and 6b opposite to the side in contact with the temperature detection portion 5.

That is, in this electromagnetic wave detection element 4, a current can flow from the first electrode 6a toward the second electrode 6c in the perpendicular-to-plane direction of the temperature detection portion 5 and a current can flow from the second electrode 6c toward the first electrode 6b in the perpendicular-to-plane direction of the temperature detection portion 5.

In FIGS. 1 and 2, for the sake of convenience, a rectangular region (a region including the temperature detection portion 5, the electromagnetic wave absorber 4A, and the two arm portions 12a and 12b) demarcated by the first lead wirings 9a and the second lead wirings 9b is expressed as the electromagnetic wave detection element 4.

The electromagnetic wave absorber 4A is constituted of the insulating films 7a, 7b, and 7c which typically absorb the infrared rays IR. However, the electromagnetic wave absorbers of the present embodiment are not limited thereto, and they may have a film shape, a layer shape, or a plate shape which can absorb electromagnetic waves and may be constituted of other members different from the insulating films. In addition, the electromagnetic wave absorbers may be constituted of a complex of an insulating film and other members.

For example, the temperature detection portion 5 is constituted of a thermistor film. Regarding the thermistor film, for example, oxides having a spinel-type crystal structure including vanadium oxide, amorphous silicon, polycrystalline silicon, and manganese; titanium oxide; yttrium-barium-copper oxide; or the like can be used.

The temperature detection portion 5 is not limited to a bolometer type using thermistor films and may be a thermopile-type (thermocouple-type), a pyroelectric-type, a diode-type, or the like.

Regarding the first electrodes 6a and 6b and the second electrode 6c, for example, conductive films made of platinum (Pt), gold (Au), palladium (Pd), ruthenium (Ru), silver (Ag), rhodium (Rh), iridium (Ir), osmium (Os), or the like can be used.

Regarding the insulating films 7a, 7b, and 7c, for example, aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, aluminum magnesium oxide, silicon boride, boron nitride, sialon (oxynitride of silicon and aluminum), or the like can be used.

The insulating films 7a, 7b, and 7c need only be constituted to be provided such that at least a part of at least the temperature detection portion 5 is covered. In the present embodiment, the insulating films 7a, 7b, and 7c are provided such that both surfaces of the temperature detection portion 5 are covered.

The electromagnetic wave detection elements 4 are formed to have the same size as each other in a rectangular shape (an octagonal shape, in the present embodiment) in a plan view. In addition, the electromagnetic wave detection elements 4 are arranged in an array within a plane parallel to the first substrate 2 and the second substrate 3 (which will hereinafter be referred to as "within a particular plane"). That is, the electromagnetic wave detection elements 4 are disposed side by side in a matrix in the first direction X and the second direction Y intersecting (orthogonal to, in the present embodiment) each other within the particular plane.

In addition, the electromagnetic wave detection elements 4 are disposed side by side with a uniform gap therebetween in the first direction X and are disposed side by side with a uniform gap therebetween in the second direction Y while having the first direction X as a row direction and having the second direction Y as a column direction.

Examples of the numbers of rows and columns of the foregoing electromagnetic wave detection elements 4 include 640 rows×480 columns and 1,024 rows×768 columns, but the numbers of rows and columns thereof are not necessarily limited thereto and can be suitably changed.

On the first substrate 2 side, a first insulator layer 8, wiring portions 9 which are electrically connected to a circuit portion 15 (which will be described below), and a pair of first connection members 11a and 11b which electrically connect each of the electromagnetic wave detection elements 4 and the wiring portions 9 to each other are provided.

The first insulator layer 8 is constituted of an insulating film laminated on a side of one surface of the first substrate 2 (a surface facing the second substrate 3). Regarding the insulating film, for example, aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, aluminum magnesium oxide, silicon boride, boron nitride, sialon (oxynitride of silicon and aluminum), or the like can be used.

The wiring portions 9 have the first lead wirings 9a and the second lead wirings 9b. For example, the first lead wirings 9a and the second lead wirings 9b are constituted of conductive films made of copper, gold, or the like.

The first lead wirings 9a and the second lead wirings 9b are positioned inside different layers in the third direction Z of the first insulator layer 8 and are disposed such that they intersect each other in a three-dimensional manner. In these, the first lead wirings 9a extend in the first direction X and are provided side by side with a uniform gap therebetween in the second direction Y. On the other hand, the second lead wirings 9b extend in the second direction Y and are provided side by side with a uniform gap therebetween in the first direction X.

In a plan view, each of the electromagnetic wave detection elements 4 is provided in each region demarcated by the first lead wirings 9a and the second lead wirings 9b. A window portion W allowing the infrared rays IR to be transmitted therethrough between the first substrate 2 and the temperature detection portion 5 is present in a region in which the temperature detection portion 5 and the first substrate 2 face each other in a thickness direction (an overlapping region in a plan view).

The pair of first connection members 11a and 11b is provided for each of the electromagnetic wave detection elements 4. The pair of first connection members 11a and 11b have the two arm portions 12a and 12b and two leg portions 13a and 13b.

In a plan view, the two arm portions 12a and 12b have two first extending portions 12aa and 12ba extending from the two connection portions 21a and 21b in directions of which components in the second direction are opposite to each other, and two second extending portions 12ab and 12bb extending from the two first extending portions 12aa and 12ba in directions of which components in the first direction are opposite to each other. The extending direction of the first extending portion 12aa and the extending direction of the second extending portions 12ab differ from each other. In addition, the extending direction of the first extending portion 12ba and the extending direction of the second extending portion 12bb differ from each other.

In the present embodiment, for example, in a plan view, the two arm portions 12a and 12b are disposed in a rotationally symmetrical manner by 180 degrees with respect to the center of the electromagnetic wave absorber 4A. The extending directions of the first extending portions 12aa and 12ba include a positive direction component and a negative direction component in the second direction (Y direction), respectively, and the extending directions of the second extending portions 12ab and 12bb include a positive direction component and a negative direction component in the first direction (X direction), respectively. In the present embodiment, the first extending portion 12aa and the first extending portion 12ba extend in directions opposite to each other, and the second extending portion 12ab and the second extending portion 12bb extend in directions opposite to each other. In the present embodiment, in a plan view, the arm portion 12a includes the first extending portion 12aa and the second extending portion 12ab as parts thereof and has a structure having a meandering shape in its entirety. In a plan view, the arm portion 12b includes the first extending portion 12ba and the second extending portion 12bb as parts thereof and has a structure having a meandering shape in its entirety.

Each of the arm portions 12a and 12b has curved conductor patterns (wiring layers) 121a and 121b, and curved insulating layer patterns (insulating layers) 122a and 122b having the wiring layers interposed therebetween in a layer thickness direction (FIG. 3).

The wiring layer 121a included in the arm portion 12a and the first electrode 6a are connected to each other by a conductor portion 121aa, and the wiring layer 121b included in the arm portion 12b and the second electrode 6b are connected to each other by a conductor portion 121ba. The first electrode 6a and the conductor portion 121aa are connected to each other in an opening portion 20a penetrating the insulating film 7b. The second electrode 6b and the conductor portion 121ba are connected to each other in an opening portion 20b penetrating the insulating film 7b.

Connection forms between the wiring layers 121a and 121b of the arm portions 12a and 12b and the electrodes 6a and 6b illustrated in FIG. 3 are examples, and the connection forms between the wiring layers of the arm portions and the electrode are not limited to those illustrated in the present embodiment.

For example, the foregoing wiring layers 121a and 121b consist of at least one selected from aluminum, tungsten, titanium, tantalum, titanium nitride, tantalum nitride, chromium nitride, and zirconium nitride.

For example, the foregoing the insulating layers 122a and 122b consist of aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, aluminum magnesium oxide, silicon boride, boron nitride, sialon (oxynitride of silicon and aluminum), or the like.

Each of the leg portions 13a and 13b is formed, as a contact plug electrically connected to the first lead wiring 9a or the second lead wiring 9b, using a conductor pillar having a circular cross section formed to extend in the third direction Z, for example, by plating of copper, gold, a FeCoNi alloy, a NiFe alloy (Permalloy), or the like.

The first connection member 11a has the wiring layer 121a which is included in the arm portion 12a, and the leg portion 13a which electrically connects the wiring layer 121a and the first lead wiring 9a to each other, thereby electrically connecting the first electrode 6a and the first lead wiring 9a to each other.

The first connection member 11b has the wiring layer 121b which is included in the arm portion 12b, and the leg portion 13b which electrically connects the wiring layer 121b and the second lead wiring 9b to each other, thereby electrically connecting the first electrode 6b and the second lead wiring 9b to each other.

Accordingly, the electromagnetic wave detection element 4 is supported in a state of being hung in the third direction Z inside the internal space K by the pair of first connection members 11a and 11b positioned in a diagonal direction within the plane thereof. In addition, a space G is provided between the electromagnetic wave detection element 4 and the first insulator layer 8.

In the electromagnetic wave sensor 1 of the present embodiment, in a plan view, four sides S1, S2, S3, and S4 of a rectangle or a square circumscribing each of the electromagnetic wave absorbers 4A with the smallest area in directions in which the electromagnetic wave absorber 4A approaches the two second extending portions 12ab and 12bb with the two connection portions 21a and 21b as fulcrums are inclined with respect to the first direction (FIG. 5). The shape of the electromagnetic wave absorber 4A is not particularly limited and may be a polygonal shape such as a quadrangular shape, a hexagonal shape, or an octagonal shape, or a shape of these polygonal shapes having chamfered corner portions.

In FIG. 5, the electromagnetic wave absorber 4A has an octagonal shape realized by chamfering corner portions of a quadrangle, and the sides S1, S2, S3, and S4 of a rectangle R circumscribing this electromagnetic wave absorber 4A with the smallest area are inclined with respect to the first direction (X direction). In this case, the gap between the second extending portion 12ab and the side S3 of the rectangle R becomes narrower as being away from the connection portion 21a. Similarly, the gap between the second extending portion 12bb and the side S4 of the rectangle R becomes narrower as being away from the connection portion 21b.

Here, the inventor has found that when a part at a temperature lower than a normal temperature, particularly a part at a temperature excessively lower than a normal temperature, is observed by the electromagnetic wave detection element, the electromagnetic wave absorber rotates in a direction in which it is away from the arm portions having the connection portions as fulcrums due to a temperature drop of the electromagnetic wave detection element or the arm portions. In the constitution in the related art, there is concern that the electromagnetic wave absorber will come into contact with other electromagnetic wave absorbers or the like adjacent thereto in the first direction (X direction) due to rotation of the electromagnetic wave absorber.

Figure 6:
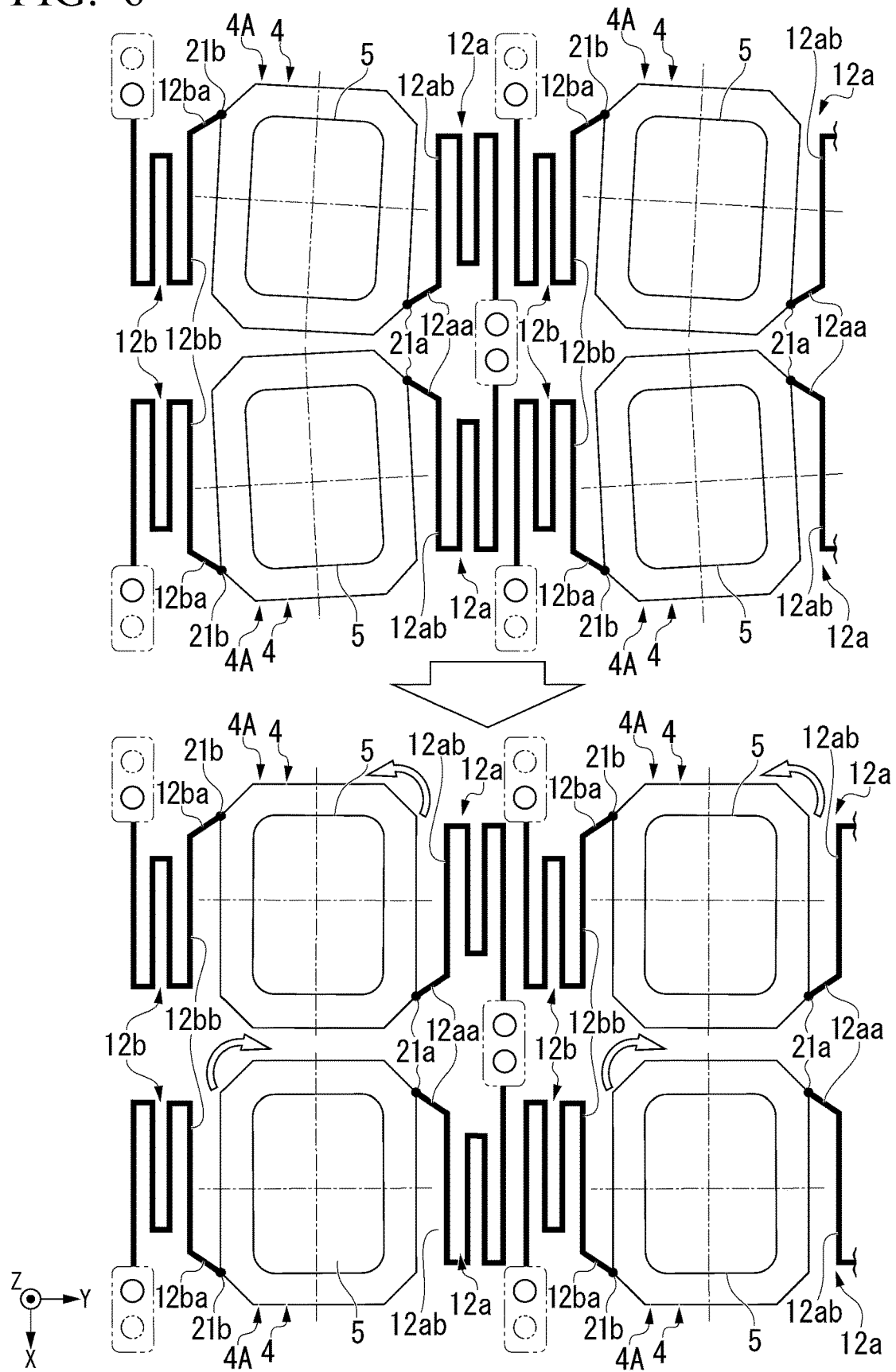
FIG. 6 is an explanatory plan view of operation of the electromagnetic wave sensor in FIG. 4 when a part at a lower temperature is observed by an electromagnetic wave detection element.

Hence, in the present embodiment, the electromagnetic wave absorber 4A is inclined in advance in a direction opposite to a rotation direction of the electromagnetic wave absorber 4A when a part at a temperature lower than a normal temperature is observed, that is, in a direction in which the electromagnetic wave absorber 4A approaches the arm portions 12a and 12b with the connection portions 21a and 21b as fulcrums. Accordingly, as illustrated in FIG. 6, even at the time of observation, a gap between the electromagnetic wave absorbers 4A adjacent to each other in the first direction is secured so that contact between the electromagnetic wave absorbers 4A can be curbed. As a result, durability of the electromagnetic wave sensor 1 can be improved.

In the present embodiment, one of the two arm portions 12a and 12b connected to one electromagnetic wave absorber 4A of the two electromagnetic wave absorbers 4A adjacent to each other in the second direction (Y direction) and one of the two arm portions 12a and 12b connected to the other electromagnetic wave absorber 4A are disposed between the two electromagnetic wave absorbers 4A adjacent to each other in the second direction (Y direction). Specifically, in FIG. 4, the arm portion 12a (or the arm portion 12b) connected to one electromagnetic wave absorber 4A of the two electromagnetic wave absorbers 4A adjacent to each other in the second direction and the arm portion 12b (or the arm portion 12a) connected to the other electromagnetic wave absorber 4A are disposed.

In addition, in the present embodiment, in the two electromagnetic wave absorbers 4A adjacent to each other in the first direction (X direction), directions of inclination of the four sides S1 to S4 of a rectangle or a square circumscribing the electromagnetic wave absorber 4A with the smallest area with respect to the first direction are opposite to each other (FIG. 4). In this case, when a part at a lower temperature is observed, in the four electromagnetic wave absorbers illustrated in FIG. 6, the two electromagnetic wave absorbers 4A in the upper stage rotate counterclockwise with the connection portions 21a and 21b as fulcrums, and the two electromagnetic wave absorbers 4A in the lower stage rotate clockwise with the connection portions 21a and 21b as fulcrums. Accordingly, even when a part at a lower temperature is observed, a gap between the electromagnetic wave absorbers 4A adjacent to each other in the first direction is secured so that contact between the electromagnetic wave absorbers 4A can be curbed. As a result, durability of the electromagnetic wave sensor 1 can be improved.

On a side of one surface of the first substrate 2 (a surface facing the second substrate 3), although illustration thereof is omitted, selection transistors (not illustrated) for selecting one electromagnetic wave detection element 4 from the electromagnetic wave detection elements 4 are provided. Each of the selection transistors is provided at a position of the first substrate 2 corresponding to each of the electromagnetic wave detection elements 4. In addition, in order to prevent irregular reflection of the infrared rays IR or deterioration in efficiency of incidence, each of the selection transistors is provided at a position avoiding the window portion W described above.

On the second substrate 3 side, a second insulator layer 14, the circuit portion 15 which detects change in voltage output from the electromagnetic wave detection element 4 and converts it into a brightness temperature, and second connection members 18a and 18b which electrically connect each of the electromagnetic wave detection elements 4 and the circuit portion 15 to each other are provided.

The second insulator layer 14 is constituted of an insulating film laminated on a side of one surface of the second substrate 3 (a surface facing the first substrate 2). Regarding the insulating film, the same insulating film as that exemplified in the foregoing first insulator layer 8 can be used.

The circuit portion 15 is constituted of a read-out integrated circuit (ROIC), a regulator, an analog-to-digital converter (A/D converter), a multiplexer, and the like and is provided inside the second insulator layer 14.

In addition, connection terminals 17a and connection terminals 17b corresponding to the first lead wirings 9a and the second lead wirings 9b, respectively, are provided on a surface of the second insulator layer 14. For example, the connection terminals 17a and 17b are constituted of conductive films made of copper, gold, or the like.

The connection terminals 17a are positioned in a region surrounding the perimeter of the circuit portion 15 on one side in the first direction X and are provided side by side with a uniform gap therebetween in the second direction Y. The connection terminals 17b are positioned in a region surrounding the perimeter of the circuit portion on one side in the second direction Y and are provided side by side with a uniform gap therebetween in the first direction X.

The second connection members 18a and 18b are provided for the first lead wirings 9a and the second lead wirings 9b, respectively. For example, the second connection members 18a and 18b is constituted of conductor pillars having a circular cross section formed to extend in the third direction Z by plating of copper, gold, or the like.

The second connection members 18a electrically connect one end sides of the first lead wirings 9a and the connection terminals 17a to each other. The second connection members 18b electrically connect one end sides of the second lead wirings 9b and the connection terminals 17b to each other. Accordingly, each of the first lead wirings 9a and the circuit portion 15 are electrically connected to each other via the second connection members 18a and the connection terminals 17a. In addition, the second lead wirings 9b and the circuit portion 15 are electrically connected to each other via the second connection members 18b and the connection terminals 17b.

In the electromagnetic wave sensor 1 of the present embodiment having the foregoing constitution, the infrared rays IR discharged from a measurement object are incident on the electromagnetic wave detection element 4 from the first substrate 2 side through the window portion W.

In the electromagnetic wave detection element 4, the infrared rays IR incident on the insulating films 7a, 7b, and 7c formed in the vicinity of the temperature detection portion 5 are absorbed by the insulating films 7a, 7b, and 7c and the infrared rays IR incident on the temperature detection portion 5 are absorbed by the temperature detection portion 5 so that the temperature of this temperature detection portion 5 varies. In addition, in the electromagnetic wave detection element 4, an output voltage between the pair of first electrodes 6a and 6b varies in accordance with a variance in electrical resistance of this temperature detection portion 5 with respect to the variance in temperature of the temperature detection portion 5. In the electromagnetic wave sensor 1 of the present embodiment, the electromagnetic wave detection elements 4 function as bolometer elements.

In the electromagnetic wave sensor 1 of the present embodiment, after the infrared rays IR discharged from a measurement object are detected by the electromagnetic wave detection elements 4 in a planar manner, an electrical signal (voltage signal) output from each of the electromagnetic wave detection elements 4 is converted into a brightness temperature so that the temperature distribution of the measurement object (temperature image) can be detected (image-captured) in a two-dimensional manner.

In the electromagnetic wave detection element 4, when a constant voltage is applied to the temperature detection portion 5, a variance in current flowing in the temperature detection portion 5 can also be detected and converted into a brightness temperature with respect to a variance in temperature of this temperature detection portion 5.

Figure 7:
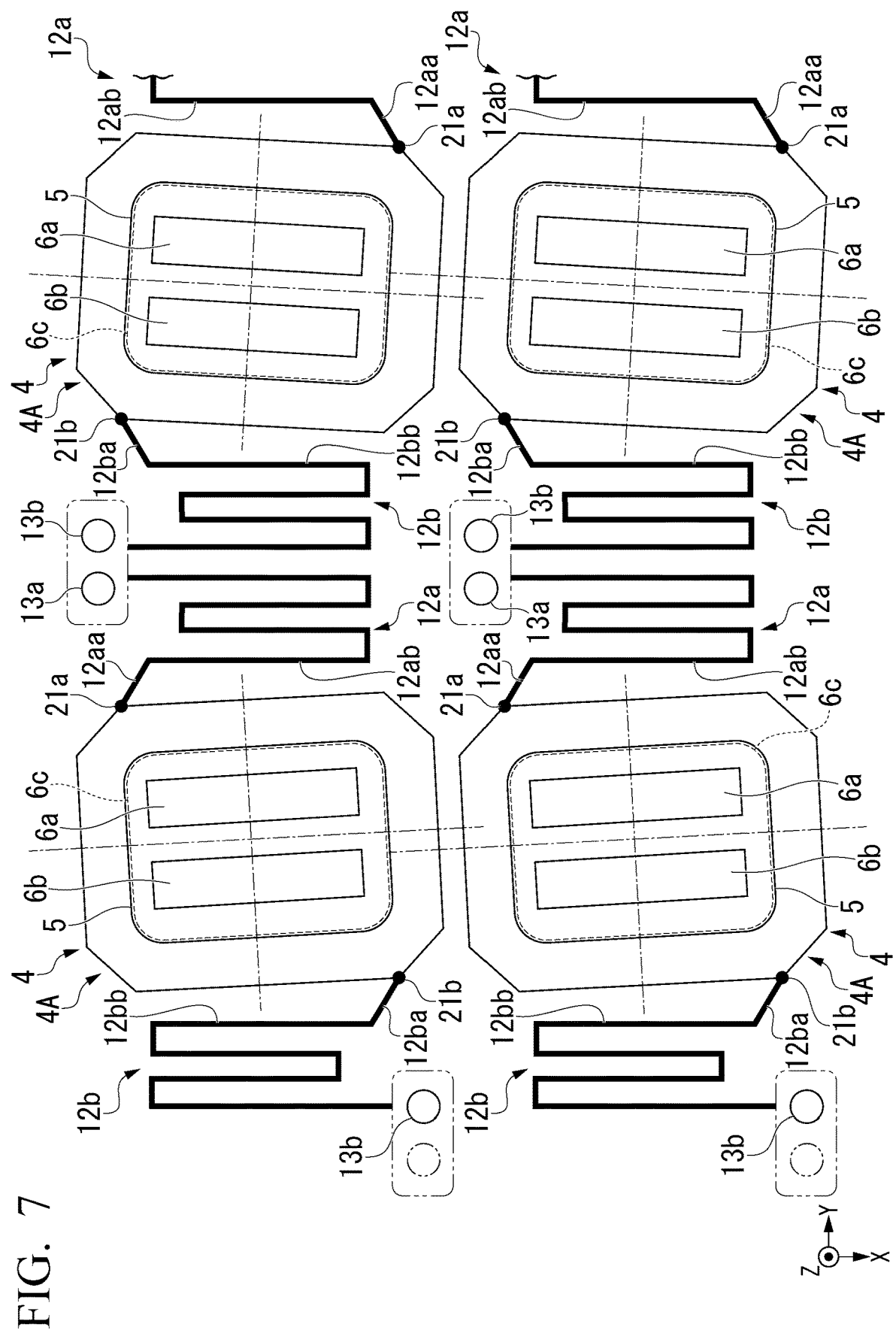
FIG. 7 is a plan view illustrating a modification example of the electromagnetic wave sensor in FIG. 4.

FIG. 7 is a plan view illustrating a modification example of the electromagnetic wave sensor 1 in FIG. 4. The electromagnetic wave sensor 1 in FIG. 7 differs from the electromagnetic wave sensor 1 in FIG. 4 in directions of inclination of two electromagnetic wave absorbers adjacent to each other in the second direction (Y direction). Specifically, in two electromagnetic wave absorbers 4A adjacent to each other in the second direction (Y direction), the directions of inclination of the four sides S1 to S4 of a rectangle or a square circumscribing the electromagnetic wave absorber 4A with the smallest area with respect to the first direction are opposite to each other. In addition, at this time, in the modification example in FIG. 7, in the two electromagnetic wave absorbers 4A adjacent to each other in the first direction (X direction), the directions of inclination of the foregoing four sides S1 to S4 with respect to the first direction may be the same as each other.

Figure 8:
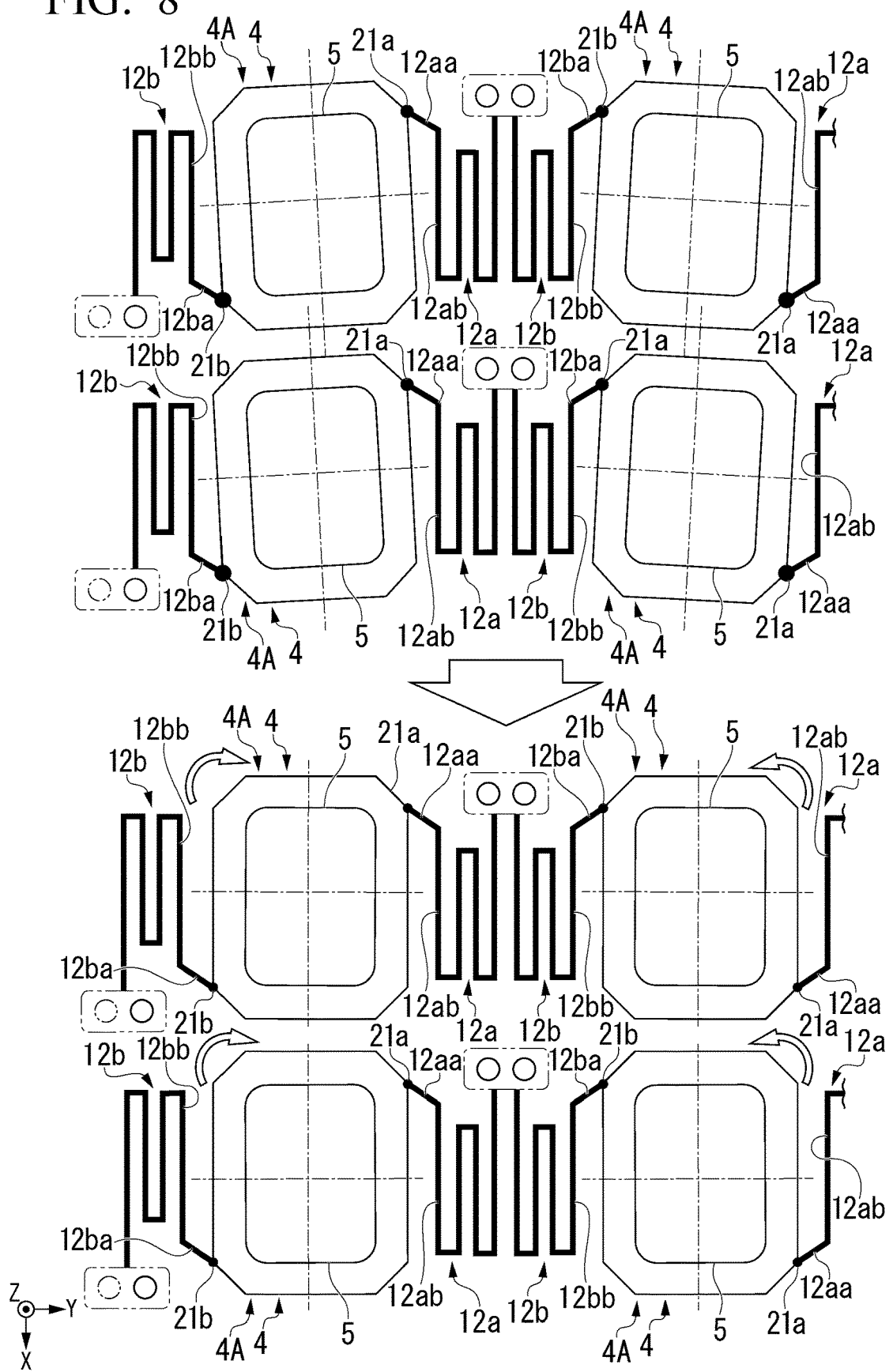
FIG. 8 is an explanatory plan view of operation of the electromagnetic wave sensor in FIG. 7 when a part at a lower temperature is observed by the electromagnetic wave detection element.

In the constitution of the present modification example, when a part at a lower temperature is observed, in the four electromagnetic wave absorbers illustrated in FIG. 8, the two electromagnetic wave absorbers 4A in the left column rotate clockwise with the connection portions 21a and 21b as fulcrums, and in the two electromagnetic wave absorbers 4A in the right column rotate counterclockwise with the connection portions 21a and 21b as fulcrums. Accordingly, even when a part at a lower temperature is observed, the gap between the electromagnetic wave absorbers 4A adjacent to each other in the first direction is secured so that contact between the electromagnetic wave absorbers 4A can be curbed.

Figure 9:
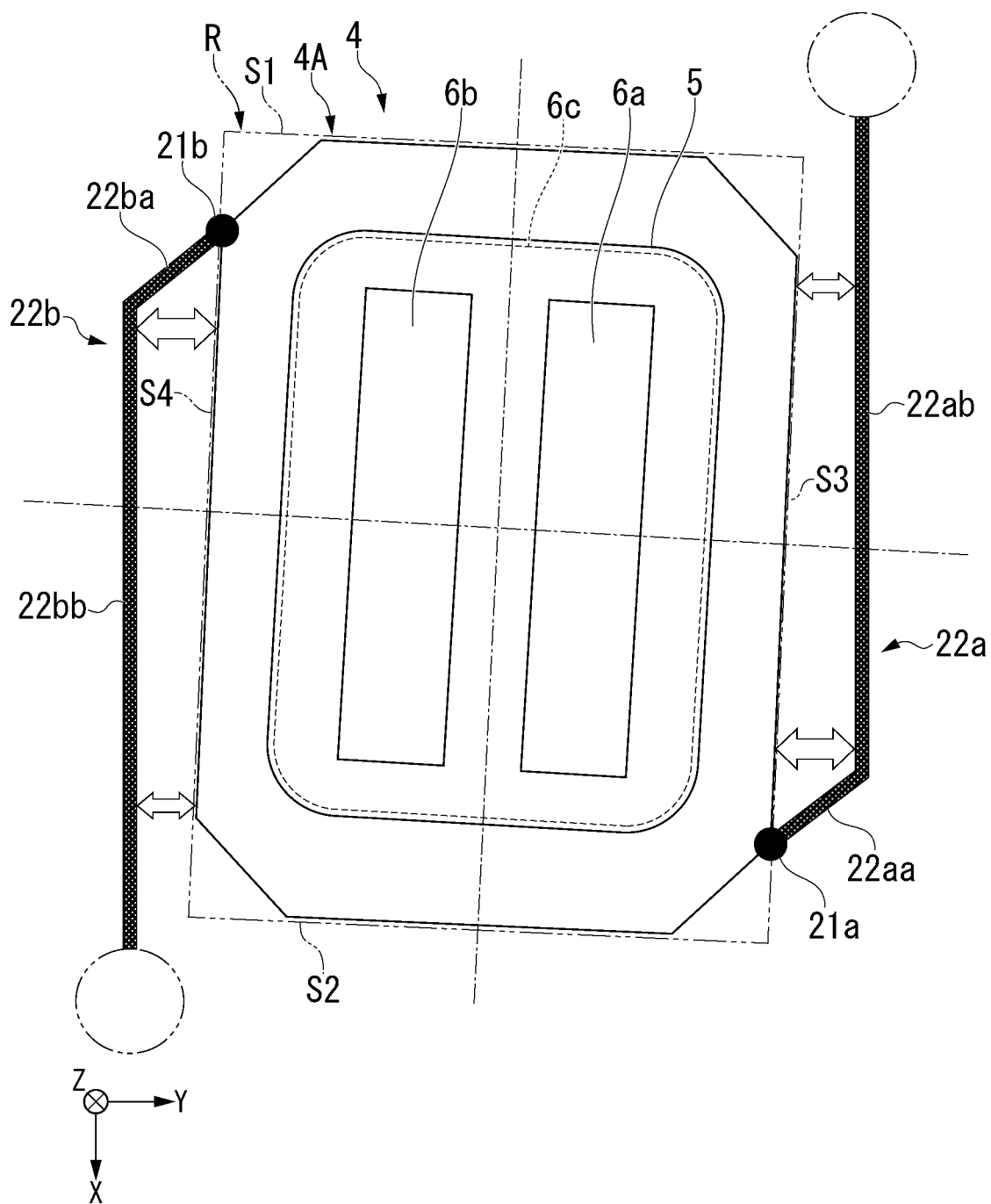
FIG. 9 is a plan view illustrating a modification example of arm portions in the electromagnetic wave sensor in FIG. 4.
Figure 10:
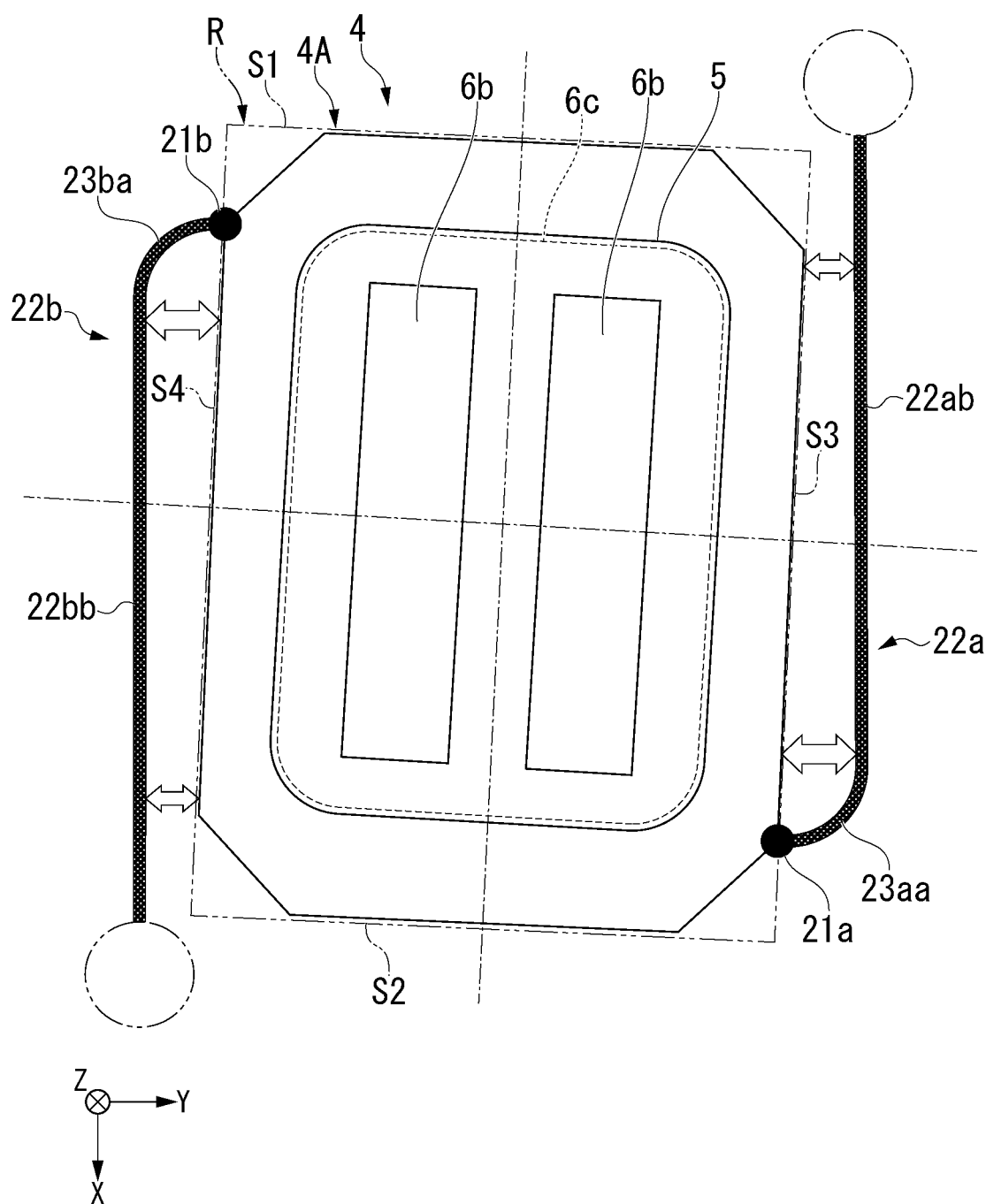
FIG. 10 is a plan view illustrating another modification example of the arm portions in the electromagnetic wave sensor in FIG. 4.

FIGS. 9 and 10 are plan views illustrating modification examples of the two arm portions 12a and 12b in the electromagnetic wave sensor 1 in FIG. 4.

As illustrated in FIG. 9, the electromagnetic wave sensor 1 may have two arm portions 22a and 22b having substantially an L-shape. In a plan view, the two arm portions 22a and 22b have two first extending portions 22aa and 22ba extending from the two connection portions 21a and 21b in directions of which the components in the second direction are opposite to each other, and two second extending portions 22ab and 22bb extending from the two first extending portions 22aa and 22ba in directions of which the components in the first direction are opposite to each other. Similar to the arm portions 12a and 12b, in a plan view, the two arm portions 22a and 22b are disposed in a rotationally symmetrical manner by 180 degrees with respect to the center of the electromagnetic wave detection element 4. The extending directions of the first extending portions 22aa and 22ba include the positive direction component and the negative direction component in the second direction (Y direction), respectively, and the extending directions of the second extending portions 22ab and 22bb include the positive direction component and the negative direction component in the first direction (X direction), respectively.

In addition, in FIG. 9, the two first extending portions 22aa and 22ba have a linear shape, but they are not limited thereto and may have other shapes. For example, as illustrated in FIG. 10, the two arm portions 22a and 22b may have first extending portions 23aa and 23ba having a curved shape. In this case, for example, the first extending portions 23aa and 23ba are connected to the second extending portions 22ab and 22bb, respectively, with a predetermined curvature.

Figure 11:
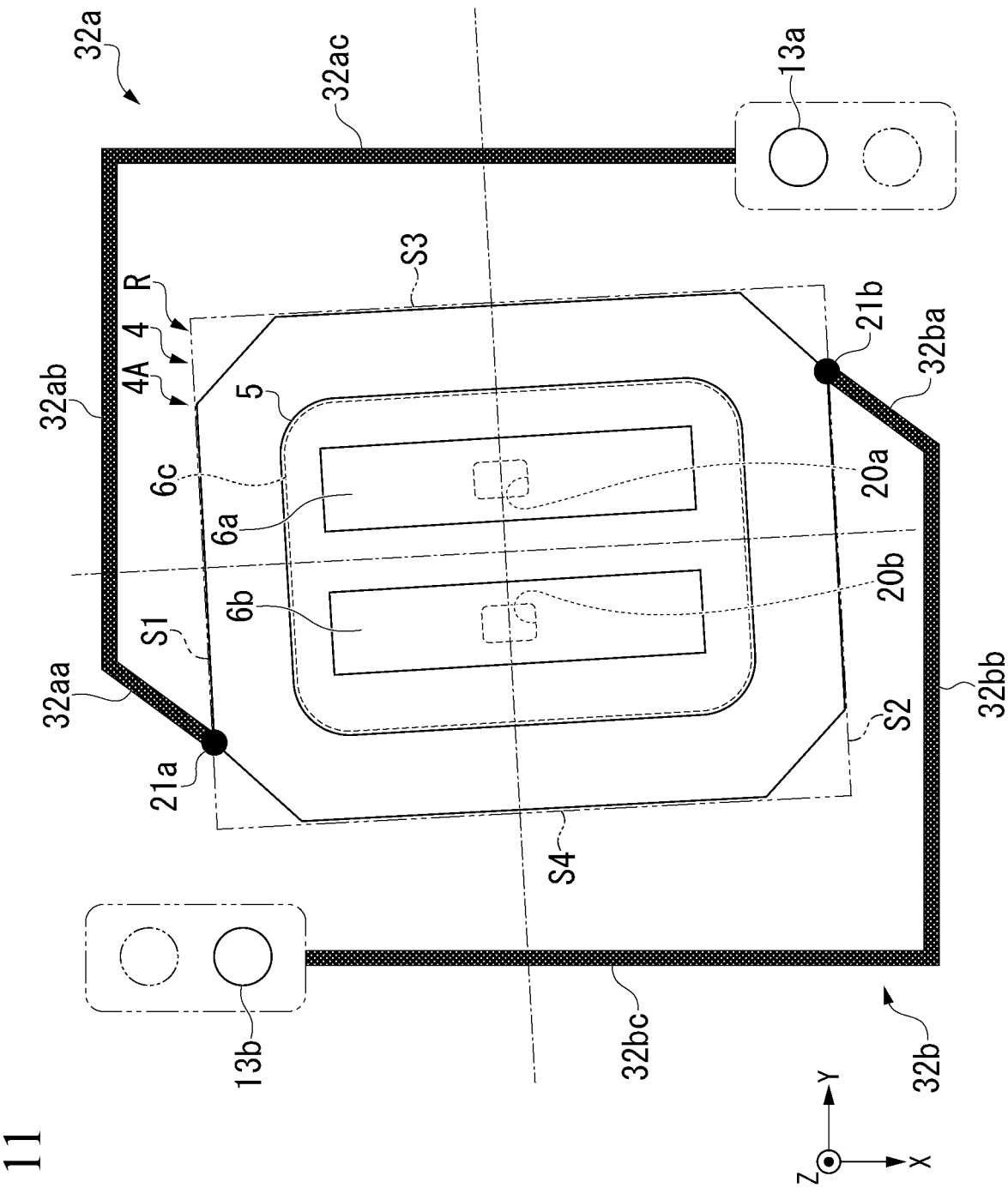
FIG. 11 is a plan view illustrating another modification example of the arm portions in the electromagnetic wave sensor in FIG. 4.

In addition, as illustrated in FIG. 11, the electromagnetic wave sensor 1 may have two arm portions 32a and 32b having substantially a U-shape. In the present modification example, different from other embodiments, the first direction is the Y direction, and the second direction is the X direction. In a plan view, the two arm portions 32a and 32b have two first extending portions 32aa and 32ba extending from the two connection portions 21a and 21b in directions of which the components in the second direction are opposite to each other, two second extending portions 32ab and 32bb extending from the two first extending portions 32aa and 32ba in directions of which the components in the first direction are opposite to each other, and two third extending portions 32ac and 32bc extending from the two second extending portions 32ab and 32bb in directions of which the components in the second direction are opposite to each other. Similar to the arm portions 12a and 12b, in a plan view, the two arm portions 32a and 32b are disposed in a rotationally symmetrical manner by 180 degrees with respect to the center of the electromagnetic wave detection element 4. The extending directions of the first extending portions 32aa and 32ba include the negative direction component and the positive direction component in the second direction (X direction), respectively, and the extending directions of the second extending portions 32ab and 32bb include the positive direction component and the negative direction component in the first direction (Y direction), respectively. In addition, the extending directions of the third extending portions 32ac and 32bc include the positive direction component and the negative direction component in the second direction (X direction), respectively.

The extending direction of the third extending portion 32ac may be parallel to or may not be parallel to the extending direction of the first extending portions 32aa. Similarly, the extending direction of the third extending portion 32bc may be parallel to or may not be parallel to the extending direction of the first extending portions 32ba.

In addition, the extending direction of the third extending portion 32ac may be perpendicular to or may not be perpendicular to the extending direction of the second extending portions 32ab. Similarly, the extending direction of the third extending portion 32bc may be perpendicular to or may not be perpendicular to the extending direction of the second extending portions 32bb.

In the electromagnetic wave sensor 1 illustrated in FIGS. 9 to 11 as well, in a plan view, four sides of a rectangle or a square circumscribing each of the electromagnetic wave absorbers 4A with the smallest area are inclined with respect to the first direction in directions in which the electromagnetic wave absorber 4A approaches the two second extending portions 22ab and 22bb (or the two second extending portions 32ab and 32bb) with the two connection portions 21a and 21b as fulcrums.

Even in the constitution of the present modification, when a part at a lower temperature is observed, the electromagnetic wave absorber 4A rotates counterclockwise with the connection portions 21a and 21b as fulcrums. Accordingly, contact between the adjacent electromagnetic wave absorbers 4A can be curbed.

In the modification examples in FIGS. 9 to 11, the electromagnetic wave sensor 1 has the two arm portions 22a and 22b having substantially an L-shape or the two arm portions 32a and 32b having substantially a U-shape, but the shape thereof is not limited thereto. The electromagnetic wave sensor 1 may have two arm portions having other shapes. In addition, there is no need for two arms to have the same shape or to be disposed in a rotationally symmetrical manner by 180°. Within a range not departing from the gist of the present disclosure, two arm portions may have different shapes or may be disposed in a non-rotationally symmetrical manner.

The present disclosure is not necessarily limited to the foregoing embodiment, and various changes can be added within a range not departing from the gist of the present disclosure.

For example, the foregoing electromagnetic wave sensor 1 has a hanging structure in which the electromagnetic wave detection elements 4 are hung from the first substrate 2 side, but it is not limited thereto. For example, as illustrated in FIGS. 12A and 12B, it may have a low installation structure in which the electromagnetic wave detection elements 4 are installed on the second substrate 3 side. In this case, for example, the second connection members 18a and 18b or the wiring portions 9 are not used, and the first connection members 11a and 11b are directly connected to a read-out circuit (ROIC) 25 serving as a circuit portion. In the examples illustrated in FIGS. 12A and 12B the electromagnetic wave detection elements 4 are disposed inside a space which is hermetically sealed by the read-out circuit (ROIC) 25, a seal member 26, and a window substrate 27, and electrode pads 28 electrically connected to the read-out circuit (ROIC) 25 are disposed outside the space.

In addition, the foregoing electromagnetic wave detection element 4 has a CPP structure. However, in contrast, it may be constituted to have a CIP structure in which the second electrode 6c is omitted.

In addition, the electromagnetic wave sensor of the present embodiment is not necessarily limited to a sensor for detecting the infrared rays described above as electromagnetic waves and may be constituted to detect different electromagnetic waves other than infrared rays. For example, the electromagnetic wave sensor may be a sensor for detecting terahertz waves having a wavelength within a range of 30 μm to 3 mm.

While embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electromagnetic wave sensor comprising:
   electromagnetic wave absorbers that are disposed side by side in a first direction and a second direction intersecting each other within a plane;
   temperature detection portions that are held by the respective electromagnetic wave absorbers; and
   a set of two arm portions that are in a bent line shape and connected to each of the electromagnetic wave absorbers at two connection portions in each of the electromagnetic wave absorbers,
   wherein in a plan view, the two arm portions have two first extending portions extending from the two connection portions in directions of which components in the second direction are opposite to each other, and two second extending portions extending from the two first extending portions in directions of which components in the first direction are opposite to each other, and
   wherein in a plan view, four sides of a rectangle or a square circumscribing each of the electromagnetic wave absorbers with a smallest area are inclined with respect to the first direction to have an inclination, the inclination being in directions in which each of the electromagnetic wave absorbers approaches the two second extending portions with the two connection portions as fulcrums.

2. The electromagnetic wave sensor according to claim 1, wherein one of the two arm portions connected to one electromagnetic wave absorber of two electromagnetic wave absorbers adjacent to each other in the second direction among the electromagnetic wave absorbers and one of the two arm portions connected to other electromagnetic wave absorber of the two electromagnetic wave absorbers are disposed between the two electromagnetic wave absorbers.

3. The electromagnetic wave sensor according to claim 1, wherein in two electromagnetic wave absorbers adjacent to each other in the first direction among the electromagnetic wave absorbers, directions of inclination of the four sides with respect to the first direction are opposite to each other.

4. The electromagnetic wave sensor according to claim 2, wherein in two electromagnetic wave absorbers adjacent to each other in the first direction among the electromagnetic wave absorbers, directions of inclination of the four sides with respect to the first direction are opposite to each other.

5. The electromagnetic wave sensor according to claim 1, wherein in two electromagnetic wave absorbers adjacent to each other in the second direction among the electromagnetic wave absorbers, directions of inclination of the four sides with respect to the first direction are opposite to each other.

6. The electromagnetic wave sensor according to claim 2, wherein in the two electromagnetic wave absorbers adjacent to each other in the second direction, directions of inclination of the four sides with respect to the first direction are opposite to each other.

7. The electromagnetic wave sensor according to claim 1, wherein, for each electromagnetic wave absorber of the electromagnetic wave absorbers, the set of two arm portions connected to the electromagnetic wave absorber include a first arm portion and a second arm portion, and
   the electromagnetic wave absorber is located between the first arm portion and the second arm portion in the second direction.

8. The electromagnetic wave sensor according to claim 2, wherein, for each electromagnetic wave absorber of the electromagnetic wave absorbers, the set of two arm portions connected to the electromagnetic wave absorber include a first arm portion and a second arm portion, and
   the electromagnetic wave absorber is located between the first arm portion and the second arm portion in the second direction.

9. The electromagnetic wave sensor according to claim 1, wherein
   the electromagnetic wave absorbers disposed side by side in both the first direction and the second direction form an N×M (N and M being integers equal to or greater than 2) array within the plane.

* * * * *